Oct. 11, 1966 D. J. WILSON 3,277,563
TOOL KIT FOR ASSEMBLY AND DISASSEMBLY OF THE PULLEY BEARING
OF AN AUTOMOBILE AIR CONDITIONER COMPRESSOR
Filed June 3, 1964 2 Sheets-Sheet 1
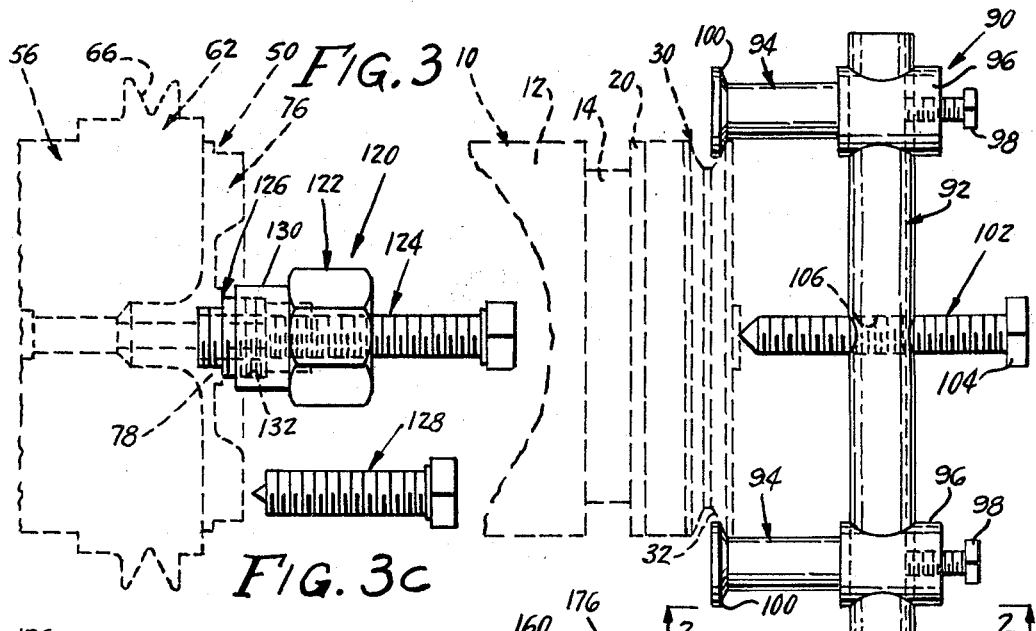
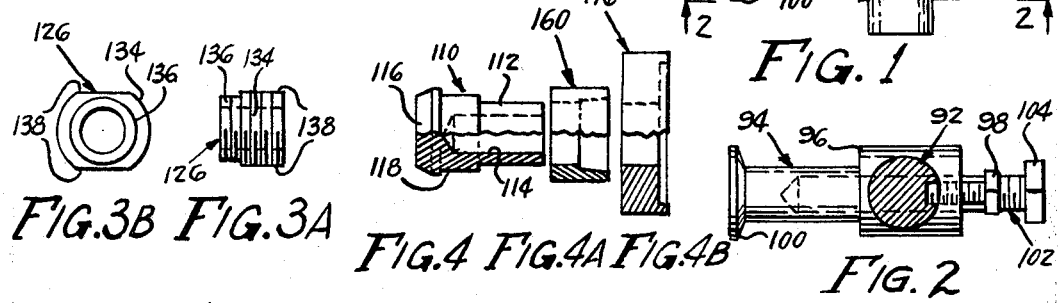
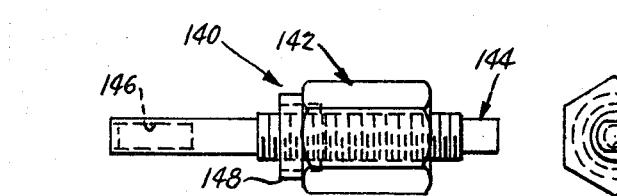
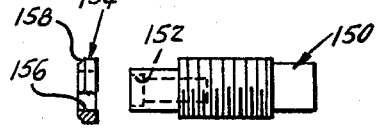
INVENTOR.
DOYCE J. WILSON
BY
Kimmel & Crowell
ATTORNEYS.

INVENTOR.
DOYCE J. WILSON
BY
Kimmel & Crowell
ATTORNEYS.

United States Patent Office 3,277,563
Patented Oct. 11, 1966

3,277,563
TOOL KIT FOR ASSEMBLY AND DISASSEMBLY OF THE PULLEY BEARING OF AN AUTOMOBILE AIR CONDITIONER COMPRESSOR
Doyce J. Wilson, Dallas, Tex., assignor to Remac Corporation, Dallas, Tex., a corporation of Texas
Filed June 3, 1964, Ser. No. 372,236
1 Claim. (Cl. 29—259)

This invention relates to a tool kit for assembly and disassembly of an automobile air conditioner compressor and more particularly to a plurality of tools to be utilized in combination with each other for the efficient and expeditious assembly and disassembly of automobile air conditioner compressors, particularly those compressors utilized on General Motors cars from 1955 to date.

A primary object of this invention is the provision of a tool kit in which the individual tools are interrelated and utilized together for removing various portions, particularly the pulley and/or bearing assemblies of automobile air conditioning compressors for inspection or maintenance and subsequently installing or reassembling these portions of the compressors.

Another object of this invention is the provision of a tool kit having individual tools which are sturdy and durable in construction, reliable and efficient in operation, and relatively simple and inexpensive to manufacture, assemble, utilize, and maintain.

A further object of the instant invention is the provision of a tool kit including parts which, with minor variation, will function to assemble and disassemble the air conditioner compressor utilized in the 1955 to 1961 models of General Motors automobiles, and also to assemble and disassemble the air conditioner compressors utilized in the 1962 to 1964 models of the same.

A still further object of this invention is to provide a tool kit of the type described, the use of the individual tools of which will prevent damage to the compressor and the clutch of the same while simultaneously reducing labor costs.

Other and further objects reside in the combination of elements, arrangement of parts, and features of construction.

Still other objects will in part be obvious and in part be pointed out as the description of the invention proceeds and as shown in the accompanying drawings.

It will be understood that while the instant invention has been described with particular reference to the 1955 through 1964 models of General Motors air conditioning compressors, the same tools, with slight modifications, may be utilized for other models of automobile air conditioning compressors, either earlier General Motors compressors or other automobile manufacturer compressors.

In the drawings:

FIGURE 1 is a side elevational view of one tool of the tool kit of the instant invention shown in dotted lines as operatively engaging the pulley assembly of a 1955 to 1961 General Motors air conditioner compressor for removing the pulley assembly therefrom;

FIGURE 2 is a transverse cross-sectional view taken substantially on line 2—2 of FIGURE 1;

FIGURE 3 is a side elevational view of a second tool of the tool kit of the instant invention carrying an adapter element and shown in dotted lines as operatively engaging the hub and drive plate assembly of a 1962 to 1964 General Motors air conditioner compressor for removal of the same;

FIGURE 3A is a side elevational view of the adapter element itself;

FIGURE 3B is a front elevational view of the same;

FIGURE 3C is an elevational view of an additional pulley element assembled in conjunction with the tool of FIGURE 3;

Figure 9:
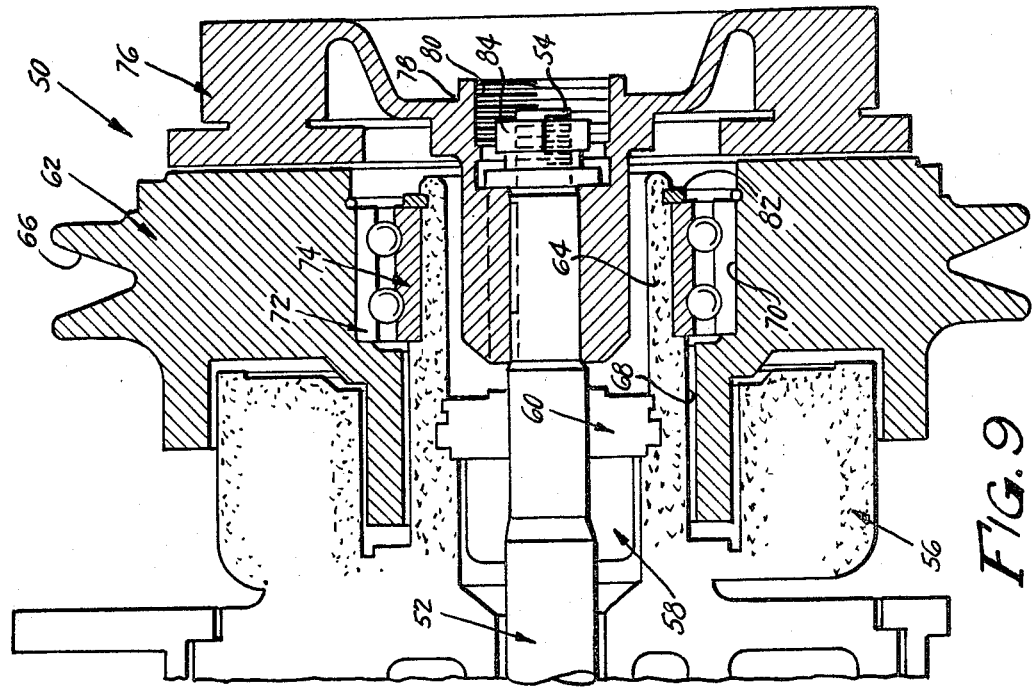
Figure 8:
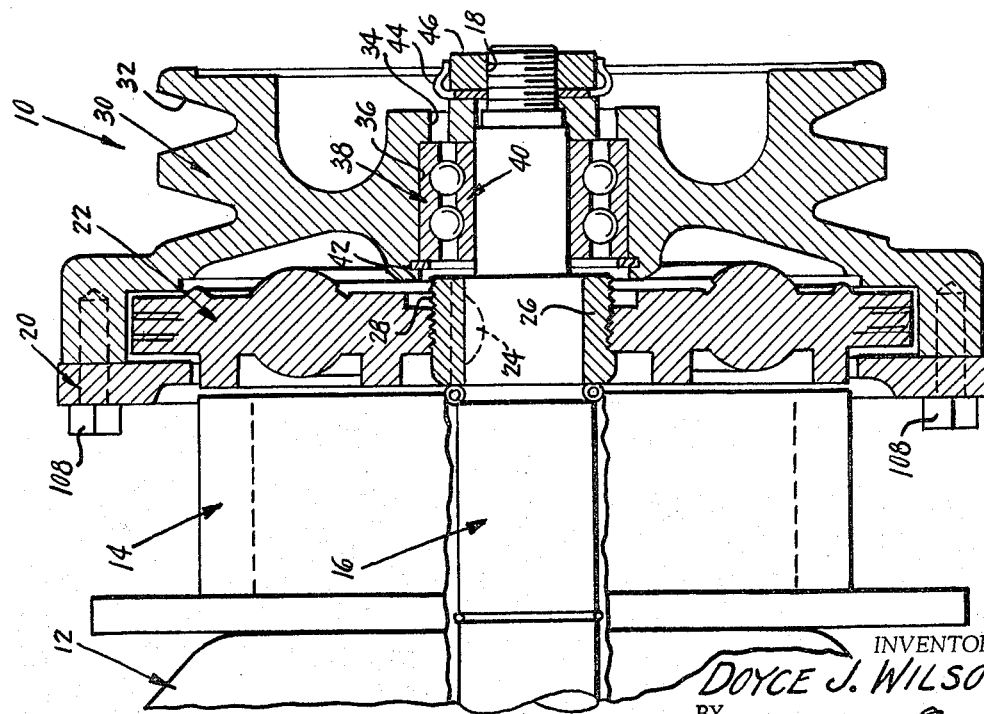

FIGURE 4 is a side elevational view of a pilot member or puller pilot, partly in section, this forming part of another tool of the tool kit of the instant invention utilized for removing the pulley assembly from a 1962 to 1964 General Motors air conditioner compressor, and also for removing and installing the pulley bearings in 1962 to 1964 models of the air conditioner compressors and for installing the pulley/bearing assembly onto the compressor on 1962 to 1964 model General Motors automobiles;

FIGURE 4A is a side elevational view of a first washer element for use with the pilot member of FIGURE 4 in installing the pulley/bearing assembly onto the compressor;

FIGURE 4B is a side elevational view, partly in section, of a second washer element for use with the pilot member of FIGURE 4 in installing the bearing into the pulley assembly;

FIGURE 5 is a side elevational view of another tool forming part of the tool kit of the instant invention utilized for installation of the hub and drive plate assembly in a 1962 to 1964 model of the General Motors air conditioner compressor;

FIGURE 6 is an end elevational view thereof;

FIGURE 7 is an exploded side elevational view of a modified stud and gauld washer, a part of the washer being cross-sectioned, for use with the tool of FIGURE 5 and 6 in the installation of the clutch and pulley assembly of the 1955 to 1961 General Motors air conditioner compressor models;

FIGURE 8 is a fragmentary side elevational view of a 1955 to 1961 General Motors air conditioner compressor/clutch, the various assemblies being shown in silhouette to facilitate an understanding of the use of the tools of the instant invention; and FIGURE 9 is a fragmentary side elevational view similar to FIGURE 8 of a 1962 to 1964 General Motors air conditioner compressor/clutch.

Similar reference characters refer to similar parts throughout the several views of the drawings.

Referring now to the drawings in general and more particularly to FIGURE 8, a 1955 to 1961 General Motors air conditioner compressor/clutch designated generally by the reference numeral 10 comprises basically a replacement compressor 12, a coil housing 14, a central compressor shaft 16 defining external threads 18, a clutch backing plate 20, a clutch plate assembly 22 slidingly received over the compressor shaft 16 and keyed thereto by a Woodruff key 24, the clutch assembly 22 defining a hub portion 26 having external threads 28 thereon, a pulley assembly 30 slidingly received on the compressor shaft 16 and including portions defining a belt receiving groove 32 and additional portions defining a central bore 34 and an annular pulley receiving groove 36, a pulley bearing including a radially outer race 38 press fit into the bearing receiving groove 36 and a radially inner race 40 extending within the central bore 34 and press fit on the compressor shaft 16, a bearing retainer 42 being removably carried by the pulley assembly 30 and locking the pulley bearing in place, and a locking retainer 44 and locking nut 46 being received over the threaded portion 18 of the compressor shaft 16 to secure the elements in related assembly.

In FIGURE 9 the 1962 to 1964 model of the General Motors air conditioner compressor/clutch is shown generally at 50 including the central compressor shaft 52 defining external threads 54, the coil and coil housing assembly 56, the shaft seal 58, and seal seat 60, the pulley assembly 62 slidingly received over the neck portion 64 of the compressor and including portions defining a belt receiving groove 66 and additional portions defining a central bore 68 and an annular bearing receiving groove 70, the pulley bearing including a radially outer race 72 press fit in the bearing receiving groove 70 and a radially inner race 74 extending into the central bore 68 and press fit on the neck portion 64, a hub and drive plate assembly 76 slidingly received over the compressor shaft 52 and including a hub portion 78 defining internal threads 80, a bearing retainer 82 normally securing the pulley bearing in position and a lock nut 84 maintaining the remainder of the elements in related assembly.

Referring now particularly to FIGURES 1 and 2, a pulley remover tool forming part of the tool kit of the instant invention is designated generally by the reference numeral 90 and comprises basically an elongated bar 92, a pair of pulley engaging arms 94 having sleeve portions 96 slidingly received over opposite ends of the bar 92 with set screws 98 for releasably securing the arms 94 in a desired position on the bar 92, the ends of the arms 94 remote from the bar 92 including beveled flanges 100 for engaging the portions of the pulley assembly defining the belt receiving groove, a stud element 102 having a hexagonal head 104 is threadably secured in an aperture 106 intermediate the arm members 94 and bears against a fixed portion of the compressor.

This tool 90 is utilized in the following manner. With the 1955 to 1961 air conditioning compressor 10, the lock nut 46 and locking retainer 44 are removed and the set screws 98 are loosened to allow the arm members 94 to be slid apart on the bar 92 so that the flanges 100 may be received over the pulley assembly to be slid inwardly for engaging the same in the belt receiving groove 32. The set screws 98 are then tightened and the stud element 102 is screwed inwardly so that its end portion bears against the end of the compressor shaft 16 forcing the pulley assembly 30 therefrom. Of course, the bolts 108 securing the backing plate 20 to the clutch assembly 30 would have to be removed before the pulley removing operation can be begun.

This same tool may be utilized in the removal of the pulley assembly 62 of the 1962 to 1964 air conditioning compressor 50 shown in FIGURE 9. With this embodiment, the lock nut 84 and the hub and drive plate assembly 76 would have to be first removed in a manner to be explained in more detail hereinafter. Since the compressor shaft 52 of the 1962 to 1964 models is a floating shaft, the pilot member shown in FIGURE 4 at 110 is utilized to preclude pressure on the shaft. This pilot member 110 includes a body portion 112 defining a central bore 114 part way therethrough which is dimensioned to be received over the end of the compressor shaft 52. The end of the pilot member 110 is closed at 116. The outer portions of the pilot member 110 define a peripheral flange 118 which bears against the neck portion 64 of the compressor 50. With this element engaged over the compressor shaft 52, the arms 94 are positioned on the bar 92 so that the flanges 100 engage the belt receiving groove 66 in a manner similar to the use of the tool 90 with the 1955 to 1961 model shown in FIGURE 8. The end portion of the stud element 102 then engages the closed end 116 of the pilot member 110 transferring the force to the neck portion 64 of the compressor 50 and removing the pulley assembly 62 of course, the bearing retainer 82 being of necessity removed in a conventional manner before the pulley assembly removal operation.

Referring now to FIGURES 3, 3A, and 3B, a second tool for use with the tool kit of the instant invention is designated generally by the reference numeral 120 and comprises basically a nut member 122 and a bolt member 124 threadably received through the nut member 122 with an adapter 126 being provided for removal of the hub and drive plate assembly 76 of the model shown at 50 in FIGURE 9 and an alternate bolt member 128 being provided for use in removal of the clutch assembly 22 of the model shown at 10 in FIGURE 8. The nut member 122 includes an offset peripheral flange 130 at one end defining internal threads 132 corresponding to the external threads 28 on the hub portion 26 of the clutch assembly 22 and also corresponding to external threads 134 on one portion of the adapter 126, additional external threads 136 being provided on the adapter 126 for engaging in the internal threads 80 on the hub and drive plate assembly 76 of the compressor 50. The portion of the adapter 126 defining the external threads 134 is flattened as at 138 to facilitate engaging the adapter 126 in the nut member 122.

The device 120 is utilized with the 1962 to 1964 compressor 50 shown in FIGURE 9 and shown in dotted lines in FIGURE 3 by securing the external threads 134 of the adapter 126 in the internal threads 132 of the peripheral flange 130 of the nut member 122 and additionally engaging the external threads 136 of the adapter 126 in the internal threads 80 of the hub portion 78 of the hub and drive plate assembly 76 after the lock nut 84 has been removed from the compressor shaft 52. By then threading the bolt member 124 into the nut member 122 so that the end portion of the bolt member 124 engages the end of the compressor shaft 52, the hub and drive plate assembly 76 will be removed therefrom.

The tool 120 may be readily adapted for use with the air conditioning compressor 10 of the 1955 to 1961 model by removing the adapter 126 and inserting the alternate bolt member 128 into the nut member 122. The internal threads 132 of the peripheral flange 130 of the nut member 122 are engaged over the external threads 28 of the hub portion 26 of the clutch assembly 22, rotation of the bolt member 128 bearing against the end of the compressor shaft 16 to slide the clutch assembly 22 therefrom after the pulley assembly 30 has been removed.

In FIGURES 5 to 7 another tool forming part of the tool kit of the instant invention is shown generally at 140 as including a nut member 142 threadedly receiving a stud 144 therethrough, the stud 144 having an end portion defining internal threads 146 corresponding to the external threads 54 on the compressor shaft 52 of the compressor embodiment 50 of FIGURE 9, the nut member including an offset peripheral flange 148 for bearing against the hub portion 78 of the hub and drive plate assembly of this model, an alternate stud 150 being threadedly received by the nut member 142 and having internal threads 152 corresponding to the external threads 18 on the compressor shaft 16 of the compressor 10 shown in FIGURE 8, a washer 154 having a central aperture 156 and a beveled end 158 for bearing against the inner race 40 of the pulley bearing of the pulley assembly 30 of this model.

The tool 140 is utilized to install the clutch and assembly 22 and the pulley assembly 30 on the compressor 10 after the backing plate 20 has been slid over the compressor shaft 16, the washer 154 being slid into engagement with the inner race 40 of the pulley bearing and the internal threads 152 of the stud 150 being engaged with the external threads 18 on the compressor shaft 16. Tightening of the nut member 142 on the stud 150 engages the peripheral flange 148 against the washer 154 to seat the clutch assembly 22 and the pulley assembly 30.

The pulley assembly 62 in the embodiment 50 of FIGURE 9 is slid onto the compressor shaft 52 and the hub and drive plate assembly 76 is then slid into position. The internal threads 146 of the stud 144 are engaged with the external threads 44 of the compressor shaft 52 of this model and the nut member 142 is tightened until the peripheral flange 148 bears against the hub 78 of the hub and drive plate assembly 76 to complete the installation of this element.

A first washer element shown in FIGURE 4A at 160 is provided for disassembling the pulley bearings from the pulley assemblies 62, and assembly of the pulley/bearing assembly onto compressor neck 64, this first washer element being slidingly received over the body portion 112 of the pilot member 110 and being dimensioned to be slidingly received within the central bore 68 of the pulley assembly to engage the inner race 74 of the pulley bearing. By sharply tapping the closed end 116 of the pilot member 110 the pulley bearing is pressed free of the bearing receiving groove 36 and by same operation the pulley/bearing assembly is installed onto compressor neck 64.

The same assembly of the pilot member 110 and the first washer element 160 is inserted from the rear or left hand side of the pulley assembly 62 of the compressor 50 shown in FIGURE 9 whereby a number of sharp taps on the closed end 116 of the pilot member 110 will remove the pulley bearing from the bearing receiving groove 70.

An additional or second washer element 170 is provided which is slidingly received over the body portion 112 of the pilot member 110 and which is dimensioned to be slidingly received in the bearing receiving groove 70 of the pulley assembly 62 to engage the outer race 72 for installation of the pulley bearing.

With the compressor 50 shown in FIGURE 9, the assembly of the pilot member 110 and the second washer element 170 is inserted from the front or right hand side of the pulley assembly 62 after the pulley bearing has been started into the bearing receiving groove 70. By sharply tapping on the closed end 116 of the pilot member 110, the pulley bearing will be seated in position.

It will be seen that in assembling the ball bearings the pressure is applied to the outer race only and the force transmitted through the outer race only to prevent injury to the bearing. In installing the pulley/bearing assembly for replacement, the force is applied against the inner race to prevent injury to the bearing.

Those with ordinary skill in the art will be familiar with the positioning of the various elements in the air conditioning compressors, allowing the correct spacing between various parts and aligning the conventional keys with the keyways during the assembly and disassembly operations. The internal parts of each of the assemblies of the compressors have not been shown on the drawings since they do not form a part of the instant invention. The details of the construction of the compressors are well known and only sufficient structural relationships have been shown to adequately illustrate the use of the tool kit of the instant invention.

The tools are particularly adapted for removal of one compressor and clutch for replacement by new parts. However, it will be readily understood that these tools may be utilized in the disassembly and assembly of air conditioning compressors of the type described for maintenance and inspection rather than replacement.

It will now be seen that there is herein provided an improved tool kit which satisfies all the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

A tool for removing a pulley assembly on an automobile air conditioner compressor having a central compressor shaft, the pulley assembly being concentric with respect to the shaft slidingly received over a fixed portion of the compressor, and including portions defining a belt-receiving groove, said tool comprising an elongated bar, a pair of pulley engaging arms slidingly received over opposite ends of said bar, means to releasably secure said arms in a desired position on said bar, each arm including a flanged end portion remote from said bar for engaging the portions of the pulley assembly defining the belt receiving groove, and a stud element threadably received through said bar intermediate said arms, said arms and said stud element extending in parallel relationship, perpendicular to said bar, said stud element having an end portion, the compressor shaft being a floating shaft, the fixed portion of the compressor being defined by a neck portion concentric with respect to the compressor shaft, said tool further comprising a pilot member having portions defining a central bore with an open end slidingly received over the end of the compressor shaft, and a closed end, said end portion of said stud element being adapted to bear against said closed end of said pilot member and other portions of said pilot member defining a peripheral flange adapted to bear against the neck portion of the compressor.

References Cited by the Examiner

UNITED STATES PATENTS

| | | | |
|---|---|---|---|
| 1,064,400 | 6/1913 | Timmins | 29—259 |
| 1,431,378 | 10/1922 | Derry | 29—259 |
| 1,472,759 | 10/1923 | Huntington | 29—260 |
| 2,821,776 | 2/1958 | Keister | 29—259 |
| 2,992,478 | 7/1961 | Baker | 29—259 |

WILLIAM FELDMAN, *Primary Examiner.*

MYRON C. KRUSE, *Examiner.*